US008811997B2

(12) United States Patent
Tenneti et al.

(10) Patent No.: US 8,811,997 B2
(45) Date of Patent: *Aug. 19, 2014

(54) SUPPORT FOR HANDOFFS IN HIGH RATE PACKET DATA SYSTEMS

(75) Inventors: Surya Tenneti, Richardson, TX (US); Sanket Nesargi, Richardson, TX (US); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,343

(22) Filed: Sep. 14, 2012

(65) Prior Publication Data

US 2013/0072197 A1  Mar. 21, 2013

Related U.S. Application Data

(63) Continuation of application No. 13/194,674, filed on Jul. 29, 2011, now Pat. No. 8,447,305, which is a continuation of application No. 12/387,621, filed on May 5, 2009, now Pat. No. 8,019,343, which is a continuation of application No. 11/295,232, filed on Dec. 6, 2005, now Pat. No. 7,546,124.

(60) Provisional application No. 60/633,868, filed on Dec. 7, 2004.

(51) Int. Cl.
*H04W 36/00* (2009.01)
*H04W 92/02* (2009.01)
*H04W 36/14* (2009.01)
*H04W 8/24* (2009.01)
*H04W 76/04* (2009.01)

(52) U.S. Cl.
CPC .......... *H04W 92/02* (2013.01); *H04W 36/0033* (2013.01); *H04W 36/14* (2013.01); *H04W 8/24* (2013.01); *H04W 76/041* (2013.01)
USPC ........................... 455/436; 455/438; 455/442

(58) Field of Classification Search
USPC .............. 455/436, 439, 438, 442, 403, 432.1; 370/310, 328, 329, 331
See application file for complete search history.

(56) References Cited

U.S. PATENT DOCUMENTS 6,134,444 A  10/2000 Kotzin
6,832,087 B2 12/2004 Gwon et al.
(Continued)

OTHER PUBLICATIONS

"1xEV: 1xEVolution IS-856 TIA/EIA Standar"; Qualcomm, Inc.; Nov. 7, 2001.

(Continued)

*Primary Examiner* — Sonny Trinh
(74) *Attorney, Agent, or Firm* — Fish & Richardson P.C.

(57) ABSTRACT

A first handoff is for an inter-AN cell selection where a source AN allows the AT to add a cell under the control of a different AN to its active set and then allows the AT to switch to the target AN. A bearer path is established between the source and target AN to transfer the data traffic using an exchange of messages to register the AT's movement from one BTS to another BTS. The A8/A10 connections remain anchored at the source AN so a bearer path is needed between the source and target AN to transfer the data traffic. The second handoff occurs when the source AN specifies a move of the AT to a new AN proactively. New connections are established at the target AN to support the AT, and the AT is subsequently moved to the target AN via the relevant air-interface messaging.

26 Claims, 2 Drawing Sheets

(56) References Cited

U.S. PATENT DOCUMENTS

| | | | |
|---|---|---|---|
| 6,909,899 B2 * | 6/2005 | Wang et al. | 455/436 |
| 6,947,399 B1 * | 9/2005 | Sen et al. | 370/331 |
| 6,978,137 B2 | 12/2005 | Gwon et al. | |
| 7,085,251 B2 | 8/2006 | Rezaiifar | |
| 7,103,662 B2 | 9/2006 | Ray et al. | |
| 7,280,505 B2 | 10/2007 | Chaskar et al. | |
| 7,512,110 B2 * | 3/2009 | Sayeedi et al. | 370/349 |
| 7,546,124 B1 | 6/2009 | Tenneti et al. | |
| 7,590,092 B2 | 9/2009 | Milton et al. | |
| 8,019,343 B2 | 9/2011 | Tenneti et al. | |
| 2006/0072506 A1 | 4/2006 | Sayeedi et al. | |
| 2006/0274692 A1 | 12/2006 | Ryu | |
| 2007/0206539 A1 | 9/2007 | Yegani et al. | |
| 2008/0089293 A1 | 4/2008 | Madour et al. | |
| 2008/0318575 A1 | 12/2008 | Ulupinar et al. | |
| 2009/0016300 A1 | 1/2009 | Ahmavaara et al. | |
| 2009/0022104 A1 | 1/2009 | Cherian et al. | |

OTHER PUBLICATIONS

Bhalla, Rajesh, et al.; "Fast Handoff in cdma2000 Wireless Networks"; Cisco Systems; Dec. 4, 2000.

Ergut, Saliah; "cdma2000 Radio Access Network"; Jul. 7, 2003.

"Introduction to CDMA2000 1x/1x-EV-DO"; RADCOM; Aug. 2003.

Molloy, Kieran; "Seamless Handoff between 802.11b and CDMA2000 Networks"; University of Canterbury; Nov. 7, 2003.

Shyy, D.J.; "Fast Layer 2 Handoff between WLAN and 3G Cellular Networks"; Defence Information System Agency; 2004.

"VoIP over 1xEV-DO"; Airvana; Nov. 5, 2004.

Notice of Allowance issued in U.S. Appl. No. 11/295,232 on Feb. 6, 2009; 9 pages.

Office Action issued in U.S. Appl. No. 12/387,621 on Dec. 20, 2010; 5 pages.

Notice of Allowance issued in U.S. Appl. No. 12/387,621 on Apr. 28, 2011; 11 pages.

Office Action issued in U.S. Appl. No. 13/194,674 on Apr. 3, 2012; 10 pages.

Office Action issued in U.S. Appl. No. 13/194,674 on Sep. 5, 2012; 11 pages.

3GPP TS 25.331 V3.20.0 (Sep. 2004); 3rd Generation Project; Technical Specification Group Radio Access Network; Radio Resource Control (RRS) protocol specification (Release 1999); 879 pages.

3GPP TS 25.423 V4.12.1 (Jun. 2004); 3rd Generation Partnership Project; Technical Specification Group Radio Access Network; UTRAN Iur interface RNSAP signalling (Release 4); 468 pages).

3GPP TS 23.101 V5.0.1 (Jan. 2004); 3rd Generation Partnership Project; Technical Specification Group Services and System Aspects General UMTS Architecture (Release 5); 14 pages.

ETSI TS 125 331 V4.15.0 (Sep. 2004); Universal Mobile Telecommunications System (UMTS); Radio Resource Control (RRC) protocol specification (3GPP TS 25.331 version 4.15.0 Release 4).

3GPP TS 25.331 V5.14.0 (Sep. 2005).

ETSI TS 125 423 V5.11.0 (Sep. 2004); Universal Mobile Telecommunications Systems (UMTS); UTRAN Iur interface Radio Network Subsystem Application Part (RNSAP) signalling (3GPP TS 25.423 version 5.11.0 Release 5).

* cited by examiner

SUPPORT FOR HANDOFFS IN HIGH RATE PACKET DATA SYSTEMS

RELATED APPLICATION DATA

This application is a continuation of U.S. application Ser. No. 13/194,674 filed on Jul. 29, 2011 now U.S. Pat. No. 8,447,305, which is a continuation of U.S. application Ser. No. 12/387,621 filed on May 5, 2009 and issued as U.S. Pat. No. 8,019,343, which is a continuation of U.S. application Ser. No. 11/295,232 filed on Dec. 6, 2005 and issued as U.S. Pat. No. 7,546,124, which is related to Provisional Patent Application Ser. No. 60/633,868 filed on Dec. 7, 2004 Priority is claimed for these earlier filings under 35 U.S.C. §120. The Provisional Patent Application and prior applications are incorporated by reference into this utility patent application.

TECHNICAL FIELD OF THE INVENTION

A method for handling hand-offs in a High Rate Packet Data (HRPD) system.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

Cellular Communication Systems

A typical cellular communication system is comprised of multiple cell sites, each covering an intended geographic region. Each of the cell sites can be assigned an address for routing information packets, and each of the Mobile Nodes can be assigned an address for their physical connectivity to the cell site.

Each cell site supports voice and data communication to the linked Mobile Nodes present within that geographic area. A wireless communication link is maintained by a transceiver at or very near the center of the cellular coverage area. The transceiver is coupled to a base station transceiver substation which is coupled to a base station controller, with controls the packet transmissions within the cell site area. The base station controller is also coupled to a mobile switching center, which routes calls handled by the base station controller and base transceiver station to a public switched telephone network or a packet data service node interface with the Internet.

Information packets on the communication system are processed by the base station controller for transmission to the public switched telephone network or the Internet. The base station controller processes the information packets for transmission to the public switched telephone network, the Internet, or the Mobile Node. As a Mobile Node moves across cellular boundaries, it changes its connectivity and its connectivity address. Routers on the communication network have to be updated with this new connectivity address so that information packet can continue to be properly routed. The address used for routing can be a single IP address, a combination of an IP address and a connectivity address, or some other similar addressing scheme providing packet routing data on the communication network corresponding to the physical connectivity of the Mobile Node.

Telecommunication networks are complex networks used to establish connections between two or more telecommunication devices. Frequently, the devices involved with a telecommunications call or connection are referred to as the originating device and the terminating device. The user typically enters an identifying number into the originating device of the terminating device to which a call is to be placed. The network responds to entry of the identifying number of the terminating device and performs a call setup procedure that establishes, among other things, a connection between the originating device and the terminating device using IP addressing. Call data, voice or multimedia, is then routed between the two devices according the IP addressing assigned to each device.

Voice and data transmitted according to the IP packet standard is the evolving and most current communication protocol for cellular telephone communication. With this migration to the IP standard and miniaturization of computer chip technology with dramatic increases in clock speeds, computational power, and memory storage has come increasingly sophisticated services such as email access, streaming video and audio data transfers, instant messaging, text messaging, multimedia applications, picture messaging, Internet website access, e-commerce applications, games and other services. Cell phones have accordingly evolved from relatively crude devices limited to telephony communication to near mini-computers with operating features and capabilities equal to if not superior to early personal computers.

Code Division Multiple Access (CDMA) is an evolving third generation communication system standard for wireless communication systems that can transmit multimedia services using the packet-based Internet protocol. These CDMA mobile communication systems support multimedia telecommunication services delivering voice (VoIP) and data, to include pictures, audio, video, streaming video, messaging, and other multimedia information over mobile wireless connections.

As the capability of the various communication standards have improved, there has been an increasing need for high-speed transmissions and increased user capacity. A new CDMA packet air interface has been developed that offers improvements over earlier CDMA systems by implementing high-speed shared-traffic packet data channels on the forward air-link connection. Recent developments include CDMA-based 1xEVsystems operating at 1.25 MHz. The 1.25 MHz carrier delivers high data rates and increased voice capacity. 1xEV is a two-phase strategy. One phase is designated 1xEV-DO, which handles data only. The 1xEV-DO standard provides user with peak data rates of 2.4 Mbits/s. The other phase is 1xEV-DV, for data and voice. Other standards are evolving that also make use of the shared packet channel and multiplex packet communication for high-speed data and voice communication.

On the CDMA standard, Mobile Nodes, or Access Terminal (AT), roam within and across cellular communication sites. Each of the cells possesses one or more transceivers coupled to a Base Transceiver Station (BTS) onto the communication network. The BTSs are in turn coupled to an Access Network. As an AT migrates across cellular borders, its BTS physical connection changes. An AT can be physically located anywhere on the network or sub-network, and its routing address data will change and require updating on other nodes. Wireless IP networks handle the mobile nature of AT with hand-off procedures designed to update the communication network and sub-network with the location of the mobile node for packet routing purposes. Because mobile nodes can move within sub-networks and between networks, hand-off procedures are needed to insure that packets are continually routed to the recipient AT as it moves from one network to another or from one sub-network to another.

As the CDMA standard evolves, newer methods and enhancements to transmitting packets on the network are being developed and deployed. There is a currently a need for a hand-off method compliant with the Interoperability Specification (e.g. TIA 856A and TIA 1054), which defines a standardized protocol interface between the base station and packet-switching equipment (PDSN, PCF). This will provide a standardized method for performing hand-offs.

SUMMARY OF THE INVENTION

The invention supports two types of handoffs. The first handoff is for an inter-AN cell selection where the source AN allows the AT to add a cell under the control of a different AN to its active set and then allows the AT to switch to the target AN. A bearer path is established between the source and target AN to transfer the packet data traffic using an exchange of messages to register the AT's movement from one BTS to another BTS. The A8/A10 connections remain anchored at the source AN and, hence, a bearer path is needed between the source and target AN to transfer the packet data traffic.

The second handoff occurs when the source AN specifies a move of the AT to a new AN proactively. New connections are established at the target AN to support the AT, and the AT is subsequently moved to the target AN via the relevant air-interface messaging.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
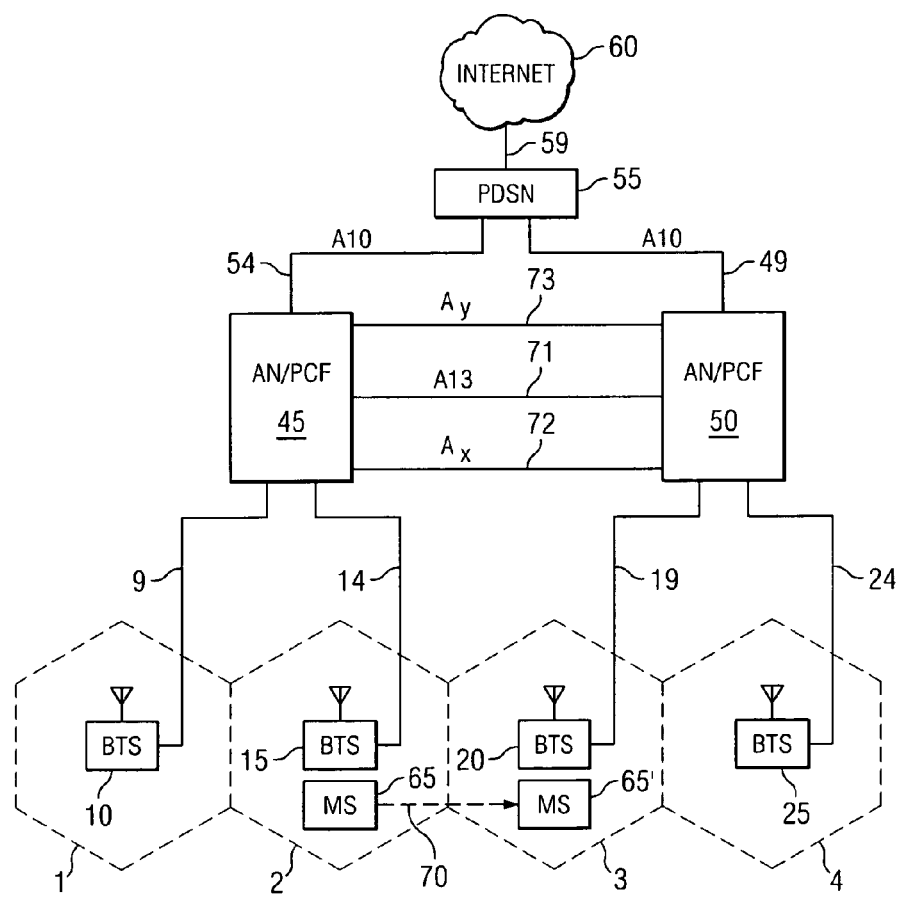
FIG. 1 is a schematic diagram of the functional elements of a wireless communication network utilizing the invention for an Inter-AN cell selection based on an implementing architecture for a CDMA system.

FIG. 1 shows the typical CDMA cellular communication system components utilizing the invention. Referring to FIG. 1, cell site 1 supports wireless communication with mobile stations (e.g. cellular phones, laptop computers, palm pilot devices, etc.) within that cell site service area. A base transceiver station (BTS) 10 provides the radio signal link to the mobile stations on the cell site 1. Cell site 2 supports wireless communication with mobile stations (e.g. cellular phones, laptop computers, palm pilot devices, etc.) within that cell site service area. A base transceiver station (BTS) 15 provides the radio signal link to the mobile stations on the cell site 2. Cell site 3 supports wireless communication with mobile stations (e.g. cellular phones, laptop computers, palm pilot devices, etc.) within that cell site service area.

A base transceiver station (BTS) 20 provides the radio signal link to the mobile stations on the cell site 3. And cell site 4 supports wireless communication with mobile stations (e.g. cellular phones, laptop computers, palm pilot devices, etc.) within that cell site service area. A base transceiver station (BTS) 25 provides the radio signal link to the mobile stations on the cell site 4.

The BTS 10 is coupled to the Access Network/Packet Control Function (AN/PCF) 35 by communication link 9. The PCF in this network stores HRPD session related information, assigns the unicast access identifier to the access terminal, performs terminal authentication procedures, and manages the location of the access terminal. The Access Terminal (AT) 65 is shown on cell site 2 coupled to BTS 15 by wireless radio link 62. The mobile station is linked to the BTS 15 by radio signal 62. The AN/PCF 45 is coupled to the Packet Data Serving Node (PDSN) 55 by communication link 54. The communication link 54 can be referred to as the A10 interface and it carries user traffic between the PCF functionality of AN/PCF 45 and the PDSN 55. The PDSN 55 is in turn coupled to the Internet 60 by communication link 59.

The BTS 20 is coupled to the AN/PCF 50 by communication link 19. The AN/PCF 50 is coupled by communication link 49 to the PDSN 55. AN/PCF 45 and AN/PCF 50 are also linked by communication interface 71, which is also referred to as the A13 interface, which carries signaling information between the PCF functions, communication interface 72, also referred to as the Ax interface, which carries signaling traffic between AN/PCF 35 and AN/PCF 50 functions, and interface 73, the Ay interface, which is the bearer path established between the AN/PCF 35 and AN/PCF 50 carrying the message traffic to and from the AT and PDSN. Ay interface carries both the signaling traffic needed to establish the connection as well as bearer traffic between AN/PCF 35 and AN/PCF 50. The AT 65 is also shown in this example as moving across the boundary of cell site 2 to cell site 3 as AT 65' along movement path 70.

When the AT 65 moves across the cell site boundary between cell site 2 and cell site 3, its physical connectivity changes from BTS 15 to BTS 20. The network must have a mechanism to handoff the AT 65 from BTS 15 to BTS 20 when making this change. In this type of handoff, the source AN/PCF 45 allows the AT 65 to add a cell under the control of AN/PCF 50 to its active set and switch to that cell site and connectivity for routing. A bearer path is required between the source AN 45 and the target AN 50 to transfer the information packet traffic. Finally, there is also a BTS 25 coupled to the AN/PCF 50 by communication link 24.

Figure 2:
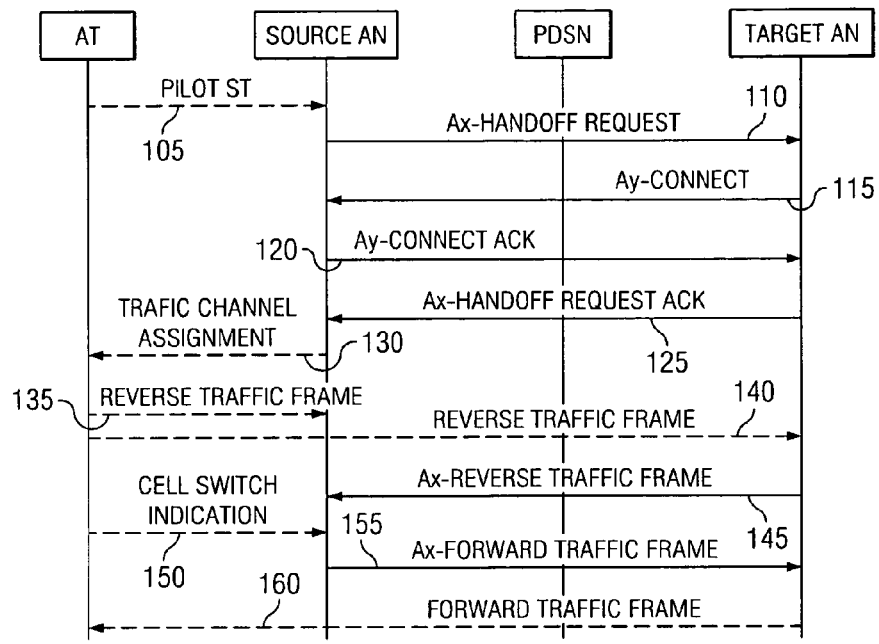
FIG. 2 shows a message flow for handoff on an Inter-AN cell selection.

FIG. 2 shows the message flow for accomplishing this type of handoff, which can be referred to as an inter-AN cell selection handoff. In step 105, the AT transmits an information packet (PILOT ST) to the Source AN with information on the pilot strength for a cell or cells under control of the Target AN. The pilot strength is the ratio of the pilot power to the total power in the signal bandwidth of the code channels from the BTS to the ATs on the cell. The pilot strength signal indicates that the AT has moved far from the current BTS and needs to change connectivity to another cell site with a stronger signal. This message can comprise a route update message.

In step 110, the Source AN transmits an Ax-Handoff Request message to establish an inter-AN handoff with the Target AN that hosts the same or all of the cells reported by the AT in step 105. The Source AN locks the session state information record (SSIR) for the AT. The SSIR includes the air interface protocol attributes and associated public data which includes the configuration attributes. This message also signals the Target AN to establish a bearer path communication link between the Source AN and Target AN using the Ax signaling interface which creates the Ay bearer path interface. The Ax Hand-off Request message includes the SSIR and cell identifiers for all the cells under control of the target AN available for allocating radio resources on both the forward and reverse links to support communication with the AT.

In step 115, the Target AN/PCF establishes Ay traffic connections (e.g. bearer paths) for all cells for which radio resources can be committed by sending an Ay Connect message to the Source AN/PCF. A single Ay Connect message can be used to establish multiple Ay traffic connections, or each Ay traffic connection can be established by a separate Ay Connect message. In step 120, the Source AN/PCF responds with an Ay Connect Acknowledge message (Ay Connect Ack) to complete the Ay connection and establish the bearer paths from the Source AN/PCF to the identified cells via the Target AN/PCF. In step 125, the Target AN/PCF transmits an Ay Handoff Request Acknowledge (Ay Handoff Ack) message to the Source AN/PCF that contains a list of cells at which radio resources were successfully committed on both the forward and reverse links and for which an Ay bearer path connection was established. In step 130, the Source AN/PCF sends a Traffic Channel Assignment message to the AT with the committed resources reported in step 125.

In step 135, the AT transmits the reverse link traffic frames to the Source AT, and in step 140 the AT transmits the reverse link traffic frames to the Target AN/PCF as the respective cells are available on the AT active set. At this point, the AT can begin to transmit reverse direction traffic via the Target AN/PCF. In step 145, the reverse link traffic frames received at the Target AN/PCF are transmitted across the Ax interface in an Ax-Reverse Traffic message. The Ax-Reverse Traffic message includes a timestamp based on the CDMA system time corresponding to the reception of the first bit of the reverse link traffic frame at the channel element of the target BTS. This timestamp is used by the Source AN/PCF to identify the same decoded traffic frame received from multiple BTSs, providing the Source AN/PCF the ability to achieve multi-link diversity.

In step 150, the AT indicates its intention to switch to a new cell via the Data Source Control (DSC) channel. The Data Source Control Channel is used by the AT to indicate the selected cell on the forward channel to the AN/PCF. After the switch, the AT only receives forward link traffic frames via the Target AN/PCF. In step 155, after the Source AN/PCF receives a forwarded data packet from the PDSN, it transmits the data packets to the Target AN/PCF using an Ax Forward Traffic Frame. In step 160, the Target AN/PCF forwards data packets to the AT using Forward Traffic Frames (e.g. forward data frames) on the traffic channel or bearer path and indicating completion of the handoff. The established bearer path is thus as follows:

Figure 3:
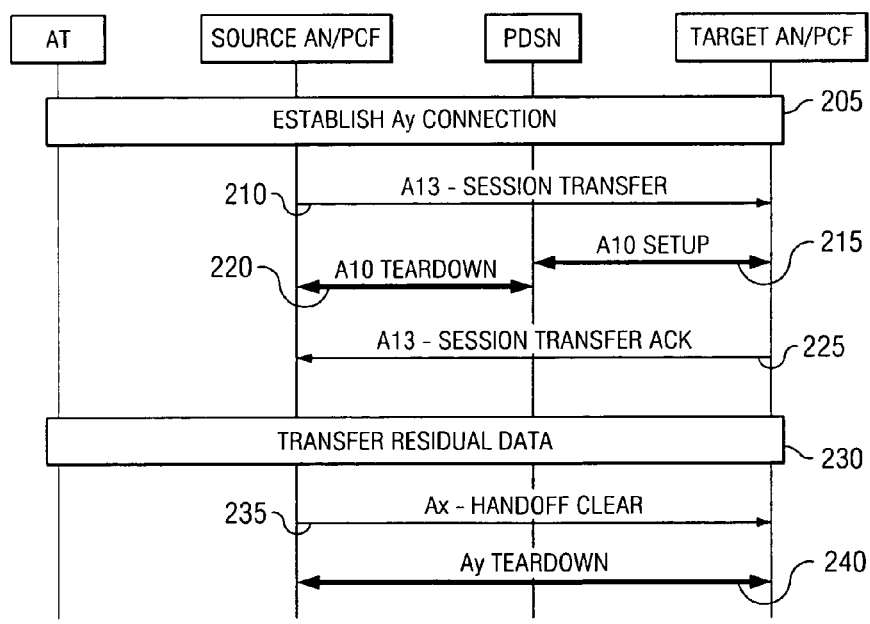
FIG. 3 shows a message flow for handoff on an inter-AN proactive session transfer.

FIG. 3 shows message flow for handoff on an inter-AN proactive session transfer. In this type of handoff, some triggering mechanism, such as a trigger algorithm, initiates the transfer. This can comprise a Route Update message indicating that the AT is located too far from the Source AN AP. In step 205, if no Ay connections currently exist, the Source AN/PCF and Target AN/PCF establish Ay connections (Establish Ay Connection) between them and determine that the A10 interface must be transferred from the Source AN/PCF to the Target AN/PCF. In step 210, the Source AN/PCF contacts the Target AN/PCF via the A13 interface to initiate the process to request the session transfer handoff of the communication session to the Target AN/PCF with an A13 Session Transfer message. The SSIR information does not need to be included because it is transferred to the Target AN/PCF at the time of the establishment of the Ay connections. However, if there are no current Ay connections between the Source AN/PCF and Target AN/PCF, the session state information record (SSIR) is also transferred at this step.

In step 215, A10 interface setup procedures (A10 Setup) are performed between Target AN/PCF and PDSN to establish A8/A10 interface connections for the Target AN/PCF and the PDSN. The A8 interface connection carries user traffic between the Target AN/PCF and the PCF functionality on the Target AN/PCF, while the A10 interface connection carries user traffic between the Target AN/PCF and the PDSN. If the PDSN chosen is different from the source PDSN, fast handoffs may be used to delay point-to-point protocol (PPP) negotiation between the AT and the target PDSN.

In step 220, the stale A8/A10 connections between the Source AN/PCF and the PDSN are torn down (A10 Teardown), and the SSIRs are unlocked and the AT moved to the Target AN/PCF. In step 225, the Target AN/PCF transmits an A13-Session Transfer Ack message to the Source AN/PCF indicating completion of the session transfer handoff procedures establishing a bearer path from the Target AN/PCF to the AT. This step may occur in parallel with step 220. In step 230, the residual data at the Source AN/PCF is transferred to the Target AN (e.g. Transfer Residual Data) via the respective Ay connections. The Target AN/PCF tags the residual data packets from the Source AN/PCF, as specified by a route selection protocol (e.g. such as defined by the TIA-154 standard), enabling the AT to distinguish between the residual Source AN/PDF packets and packets received at the Target AN/PCF directly from the PDSN. This marking process is transparent to the Ay interface connection. The AT communicates only with the target BTS to perform this purge.

After all the residual data from the Source AN/PCF has been transferred across the Ay interfaces, in step 235, the Source AN/PCF transmits an Ax-Handoff Clear message to the Target AN/PCF to indicate completion of residual data transfer. In step 240, in response to the Ax-Handoff Clear message received in step 235, the Target AN/PCF initiates the release of Ay connections (Ay Teardown) corresponding to the AT because these Ay connections are no longer used.

While the invention has been particularly shown and described with respect to preferred embodiments, it will be readily understood that minor changes in the details of the invention may be made without departing from the spirit of the invention.

Having described the invention, we claim:

1. A method for handoff of an access terminal from a source access network, the method at the source access network comprising:
    sending, through a packet air interface, a handoff initiation message to a target access network;
    establishing a bearer path connection between the source access network and a target access network, wherein the bearer path is configured to transfer, from the source access network to the target access network, packet data traffic that was received from a packet core network; and
    receiving a handoff initiation acknowledgement from the target access network.

2. The method of claim 1, the method further comprising determining that handoff of the access terminal is desirable, wherein determining that handoff of the access terminal is desirable comprises analyzing a signal strength indication for a cell under control of the target access network.

3. The method of claim 1, the method further comprising determining that handoff of the access terminal is desirable, wherein determining that handoff of the access terminal is desirable comprises receiving from the access terminal a cell switch indication.

4. The method of claim 1, the method further comprising determining that handoff of the access terminal is desirable, wherein determining that handoff of the access terminal is desirable comprises receiving an indication indicating that proactive session transfer of the access terminal to the target access network is desirable.

5. The method of claim 4, the method further comprising receiving a route update message from the access terminal.

6. The method of claim 4, wherein sending a handoff initiation message comprises sending a session transfer message to the target access network; and receiving a handoff initiation acknowledgement comprises receiving a session transfer acknowledgement from the target access network.

7. The method of claim 1, wherein the handoff initiation message comprises the session state information record and cell identifiers for cells under control of the target access network, the session state information record comprising air interface protocol attributes and configuration attributes of the access terminal.

8. The method of claim 1, wherein establishing a bearer path connection comprises:
    receiving a connect message from the target access network, the connect message including cells for which radio resources are available on the target access network; and
    sending a connect acknowledgement message to the target access network.

9. The method of claim 1, wherein the handoff initiation acknowledgement comprises a list of cells at which radio resources for both forward and reverse links have been successfully committed and for which a bearer path has been established.

10. The method of claim 1, the method further comprising sending a traffic channel assignment message to the access terminal with radio resources.

11. The method of claim 1, wherein at least one of the target access network or the source access network includes packet-switching equipment.

12. The method of claim 1, wherein the packet air interface is a data-only air interface.

13. A source access network comprising a processor for handoff of an access terminal to a target access network, the processor is configured to:
- send, through a packet air interface, a handoff initiation message to the target access network;
- establish a bearer path connection between the source access network and the target access network, wherein the bearer path is configured to transfer, from the source access network to the target access network, packet data traffic that was received from a packet core network; and
- receive a handoff initiation acknowledgement from the target access network.

14. The source access network of claim 13, further comprising determining that handoff of the access terminal is desirable, wherein determining that handoff of the access terminal is desirable comprises the processor configured to receive from the access terminal a signal strength indication for a cell under control of the target access network.

15. The source access network of claim 13, further comprising determining that handoff of the access terminal is desirable, wherein determining that handoff of the access terminal is desirable comprises the processor configured to receive from the access terminal a cell switch indication.

16. The source access network of claim 13, further comprising determining that handoff of the access terminal is desirable, wherein determining that handoff of the access terminal is desirable comprises the processor configured to receive an indication indicating that proactive session transfer of the access terminal to the target access network is desirable.

17. The source access network of claim 16, wherein the processor is further configured to receive a route update message from the access terminal.

18. The source access network of claim 16, wherein sending a handoff initiation message comprises the processor being configured to send a session transfer message to the target access network; and receiving a handoff initiation acknowledgement comprises the processor being configured to receive a session transfer acknowledgement from the target access network.

19. The source access network of claim 13, wherein the handoff initiation message comprises the session state information record and cell identifiers for cells under control of the target access network, the session state information record comprising air interface protocol attributes and configuration attributes of the access terminal.

20. The source access network of claim 13, wherein establishing a bearer path connection comprises the processor configured to:
- receive a connect message from the target access network, the connect message including cells for which radio resources are available on the target access network; and
- send a connect acknowledgement message to the target access network.

21. The source access network of claim 13, wherein the handoff initiation acknowledgement comprises a list of cells at which radio resources for both forward and reverse links have been successfully committed on the target access network and for which a bearer path has been established.

22. The source access network of claim 13, wherein at least one of the target access network or the source access network includes packet-switching equipment.

23. The source access network of claim 13, wherein the packet air interface is a data-only air interface.

24. A method for handoff of an access terminal from a source access network, the method at the source access network comprising:
- receiving, through a packet air interface, an indication that handoff of the access terminal is desirable;
- sending a handoff initiation message to a target access network;
- establishing a bearer path connection between the source access network and the target access network;
- receiving a handoff initiation acknowledgement from the target access network; and
- sending a traffic channel assignment message to the access terminal with radio resources.

25. The method of claim 24, wherein at least one of the target access network or the source access network includes packet-switching equipment.

26. The method of claim 24, wherein the packet air interface is a data-only air interface.

* * * * *

UNITED STATES PATENT AND TRADEMARK OFFICE
CERTIFICATE OF CORRECTION

PATENT NO. : 8,811,997 B2  
APPLICATION NO. : 13/620343  
DATED : August 19, 2014  
INVENTOR(S) : Surya Tenneti et al.

Page 1 of 1

It is certified that error appears in the above-identified patent and that said Letters Patent is hereby corrected as shown below:

On the Title Page

Page 2, Column 2 item (56) (Other Publications), Line 12, Before "Project" insert -- Partnership --.

Page 2, Column 2 item (56) (Other Publications), Line 14, Delete "(RRS)" and insert -- (RRC) --, therefor.

Page 2, Column 2 item (56) (Other Publications), Line 26, Delete "Systems" and insert -- System --, therefor.

Signed and Sealed this  
Twenty-first Day of October, 2014

Michelle K. Lee  
*Deputy Director of the United States Patent and Trademark Office*